(12) United States Patent
Shirai

(10) Patent No.: US 8,386,146 B2
(45) Date of Patent: Feb. 26, 2013

(54) INTER-VEHICLE DISTANCE CONTROL APPARATUS AND INTER-VEHICLE DISTANCE CONTROL METHOD

(75) Inventor: Takao Shirai, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 385 days.

(21) Appl. No.: 12/667,055

(22) PCT Filed: Apr. 1, 2009

(86) PCT No.: PCT/IB2009/005142
§ 371 (c)(1),
(2), (4) Date: Dec. 29, 2009

(87) PCT Pub. No.: WO2009/141693
PCT Pub. Date: Nov. 26, 2009

(65) Prior Publication Data
US 2010/0198477 A1    Aug. 5, 2010

(30) Foreign Application Priority Data

May 20, 2008   (JP) ................................. 2008-132280

(51) Int. Cl.
*B60W 30/16* (2006.01)
(52) U.S. Cl. ............ 701/96; 180/170; 701/93; 701/301; 340/903
(58) Field of Classification Search .................... 701/93, 701/96, 301; 340/435, 436, 903; 180/170
See application file for complete search history.

(56) References Cited

U.S. PATENT DOCUMENTS

| | | | |
|---|---|---|---|
| 5,761,629 A | 6/1998 | Gilling | |
| 7,136,013 B2* | 11/2006 | Hanawa et al. | 342/70 |
| 7,613,568 B2* | 11/2009 | Kawasaki | 701/301 |
| 7,753,153 B2* | 7/2010 | Swoboda et al. | 180/170 |
| 7,945,369 B2* | 5/2011 | Lindqvist et al. | 701/96 |
| 2002/0021229 A1* | 2/2002 | Stein | 340/933 |
| 2005/0010351 A1* | 1/2005 | Wagner et al. | 701/96 |

(Continued)

FOREIGN PATENT DOCUMENTS

| | | |
|---|---|---|
| DE | 10 2006 034 411 | 1/2008 |
| DE | 10 2006 046 903 | 4/2008 |

(Continued)

OTHER PUBLICATIONS

Office Action issued Jan. 8, 2010, in Japanese Patent Application No. 2008-132280, filed May 20, 2008 (with English language translation).

*Primary Examiner* — Ruth Ilan
(74) *Attorney, Agent, or Firm* — Oblon, Spivak, McClelland, Maier & Neustadt, L.L.P.

(57) ABSTRACT

In an inter-vehicle distance control apparatus and an inter-vehicle distance control method, object detection information is obtained from a detection portion that detects a first preceding vehicle ahead of a vehicle, and an object ahead of the first preceding vehicle; a first possible target stop position is calculated taking into account the first preceding vehicle, and a second possible target stop position is calculated taking into account the object, based on the object detection information; and a target stop position for the vehicle is set to one of the first possible target stop position and the second possible target stop position, which is closer to the vehicle than the other of the first possible target stop position and the second possible target stop position is.

13 Claims, 8 Drawing Sheets

U.S. PATENT DOCUMENTS

2005/0240335 A1* 10/2005 Schroder .................... 701/96
2006/0155469 A1* 7/2006 Kawasaki .................... 701/301

FOREIGN PATENT DOCUMENTS

| | | |
|---|---|---|
| EP | 0 716 949 | 6/1996 |
| JP | 10 181487 | 7/1998 |
| JP | 2002 104015 | 4/2002 |
| JP | 2004-106588 | 4/2004 |
| JP | 2004-322729 | 11/2004 |
| JP | 2005-170154 | 6/2005 |
| JP | 2005 231490 | 9/2005 |
| JP | 2006-264571 | 10/2006 |

* cited by examiner

INTER-VEHICLE DISTANCE CONTROL APPARATUS AND INTER-VEHICLE DISTANCE CONTROL METHOD

BACKGROUND OF THE INVENTION

1. Field of the Invention

The invention relates to an inter-vehicle distance control apparatus and an inter-vehicle distance control method. More specifically, the invention relates to an inter-vehicle distance control apparatus and an inter-vehicle distance control method that control a distance between a vehicle and a first preceding vehicle ahead of the vehicle, by controlling drive power and braking power of the vehicle.

2. Description of the Related Art

Vehicles provided with Adaptive Cruise Control (ACC) systems have been put into practical use. The ACC systems maintain a distance between a host vehicle and a vehicle ahead of the host vehicle (hereinafter, the vehicle ahead of the host vehicle will be referred to as "first preceding vehicle"), or the speed of the host vehicle by automatically controlling drive power and braking power of the host vehicle. The ACC systems are classified into a low speed range ACC system, a high speed range ACC system, and a full speed range ACC system, according to a speed range in which the host vehicle is controlled, and a control method.

For example, the high speed range ACC system controls the host vehicle so that when there is the first preceding vehicle ahead of the host vehicle, the host vehicle travels in a high speed range and follows the first preceding vehicle while the distance between the host vehicle and the first preceding vehicle is maintained at a preset inter-vehicle distance, and when there is no first preceding vehicle ahead of the host vehicle, the host vehicle constantly travels at a preset upper limit speed. The low speed range ACC system controls the host vehicle so that when there is the first preceding vehicle ahead of the host vehicle, the host vehicle travels in a low speed range, and follows the first preceding vehicle while the distance between the host vehicle and the first preceding vehicle is maintained at a preset inter-vehicle distance, and when there is no first preceding vehicle ahead of the host vehicle, a vehicle-following control for following the first preceding vehicle is stopped. The full speed range ACC system controls the host vehicle so that when there is the first preceding vehicle ahead of the host vehicle, the host vehicle follows the first preceding vehicle while the distance between the host vehicle and the first preceding vehicle is maintained at an inter-vehicle distance set for each speed in an entire vehicle speed range, and when there is no first preceding vehicle ahead of the host vehicle, the host vehicle constantly travels at a preset vehicle speed. Thus, the full speed range ACC system seamlessly controls the host vehicle in the entire vehicle speed range from the low speed range to the high speed range.

Japanese Patent Application Publication No. 2005-231490 (JP-A-2005-231490) describes a vehicle-following control apparatus that includes the ACC system. The vehicle-following control apparatus described in the publication No. 2005-231490 sets a target stop position for the host vehicle, based on a positional relation between the host vehicle provided with the vehicle-following control apparatus and the first preceding vehicle, and executes a stop control. Also, the vehicle-following control apparatus described in the publication No. 2005-231490 changes the control from the stop control to the vehicle-following control for following the first preceding vehicle, when a vehicle ahead of the first preceding vehicle (hereinafter, the vehicle ahead of the first preceding vehicle will be referred to as "second preceding vehicle") starts moving while the host vehicle is stopped.

If the second preceding vehicle suddenly stops or the second preceding vehicle is stopped while the host vehicle and the first preceding vehicle are traveling, the first preceding vehicle may suddenly stop, or may avoid the second preceding vehicle by steering, to avoid a collision with the second preceding vehicle. However, the vehicle-following control apparatus described in the publication No. 2005-231490 does not take into account the possibility that the first preceding vehicle may be in the above-described situation. Therefore, it is difficult for the vehicle-following control apparatus to appropriately control the travel of the host vehicle when the above-described situation occurs. Also, when the vehicle-following control is executed so that the host vehicle follows the first preceding vehicle while the distance between the host vehicle and the first preceding vehicle is maintained, the stopped second preceding vehicle is not generally taken into account. Therefore, the vehicle-following control apparatus may not be able to appropriately control the host vehicle when the second preceding vehicle is stopped.

SUMMARY OF THE INVENTION

The invention provides an inter-vehicle distance control apparatus and an inter-vehicle distance control method, which reduce the possibility that a host vehicle is suddenly braked when a control that stops the host vehicle is executed.

A first aspect of the invention relates to an inter-vehicle distance control apparatus that includes an information obtaining portion, a possible-target-stop-position calculation portion, and a target-stop-position setting portion. The information obtaining portion obtains object detection information from a detection portion that detects a first preceding vehicle ahead of a vehicle, and an object ahead of the first preceding vehicle. The possible-target-stop-position calculation portion calculates a first possible target stop position taking into account the first preceding vehicle, and calculates a second possible target stop position taking into account the object, based on the object detection information. The target-stop-position setting portion sets a target stop position for the vehicle to one of the first possible target stop position and the second possible target stop position, which is closer to the vehicle than the other of the first possible target stop position and the second possible target stop position is.

In the above-described aspect, the object may be a second preceding vehicle ahead of the first preceding vehicle.

With the above-described configuration, the first possible target stop position is calculated taking into account the first preceding vehicle, and the second possible target stop position is calculated taking into account the second preceding vehicle. The target stop position is set to one of the first possible target stop position and the second possible target stop position, which is closer to the vehicle than the other of the first possible target stop position and the second possible target stop position is. This reduces the possibility that the host vehicle is suddenly braked. For example, the second preceding vehicle may suddenly stop, or the second preceding vehicle may be stopped, and accordingly, the first preceding vehicle may be suddenly braked. In this case, it is possible to avoid the situation where the host vehicle is suddenly braked, by setting the target stop position for the host vehicle to the second possible target stop position calculated taking into account the second preceding vehicle.

In the above-described aspect, when the second preceding vehicle is stopped, the possible-target-stop-position calculation portion may calculate the second possible target stop position based on a position at which the second preceding vehicle is stopped.

When the second preceding vehicle is stopped, the first preceding vehicle may suddenly stop, or the first preceding vehicle may avoid a collision with the second preceding vehicle by steering. In this case, with the above-described configuration, it is possible to avoid the situation where the host vehicle is suddenly braked, by setting the target stop position to the second possible target stop position calculated taking into account the second preceding vehicle.

In the above-described aspect, when the object is an obstacle ahead of the first preceding vehicle, the possible-target-stop-position calculation portion may calculate the second possible target stop position based on a position at which the obstacle is located.

In the above-described aspect, the possible-target-stop-position calculation portion may calculate, as the second possible target stop position, a position at which the vehicle is estimated to stop on an assumption that the first preceding vehicle stops at a target inter-vehicle distance from the position at which the second preceding vehicle is stopped, and the vehicle stops at the target inter-vehicle distance from the first preceding vehicle.

With the above-described configuration, the second possible target stop position is calculated based on the position at which the first preceding vehicle is estimated to stop based on the position at which the second preceding vehicle is stopped. Therefore, it is possible to appropriately calculate the second possible target stop position taking into account the second preceding vehicle.

In the above-described aspect, the possible-target-stop-position calculation portion may calculate, as the second possible target stop position, a position at which the vehicle is estimated to stop on an assumption that the first preceding vehicle stops at a distance longer than a target inter-vehicle distance from the position at which the second preceding vehicle is stopped, and the vehicle stops at the target inter-vehicle distance from the first preceding vehicle.

With the above-described configuration, the position, at which the first preceding vehicle is estimated to stop, is calculated based on the position at which the second preceding vehicle is stopped, taking into account a safety factor. Therefore, it is possible to appropriately calculate the second possible target stop position taking into account the second preceding vehicle.

In the above-described aspect, when the first preceding vehicle is decelerating, the possible-target-stop-position calculation portion may calculate the first possible target stop position based on a position at which the first preceding vehicle is estimated to stop.

With the above-described configuration, it is possible to calculate the first possible target stop position taking into account the first preceding vehicle that is decelerating to stop.

In the above-described aspect, the possible-target-stop-position calculation portion may determine a position at which the first preceding vehicle is estimated to stop based on deceleration of the first preceding vehicle, and may calculate, as the first possible target stop position, a position at which the vehicle is estimated to stop on an assumption that the vehicle stops at a target inter-vehicle distance from the first preceding vehicle that is stopped at the determined position.

With the above-described configuration, the first possible target stop position is calculated based on the position at which the first preceding vehicle, which is decelerating, is estimated to stop. Therefore, it is possible to appropriately calculate the first possible target stop position taking into account the first preceding vehicle.

The inter-vehicle distance control apparatus according to the above-described aspect may further include a vehicle control portion. In this case, the vehicle control portion selectively executes a traveling control that makes the vehicle follow the first preceding vehicle in a manner such that a distance between the vehicle and the first preceding vehicle is equal to a target inter-vehicle distance corresponding to a current speed of the vehicle, and a stop control that stops the vehicle at the target stop position set by the target-stop-position setting portion, according to a traveling state of the first preceding vehicle.

In the above-described aspect, when the first preceding vehicle is not decelerating, the vehicle control portion may execute the traveling control, and when the first preceding vehicle is decelerating, the vehicle control portion may execute the stop control. When the first preceding vehicle is not decelerating, or when the first preceding vehicle is decelerating so that the first preceding vehicle does not stop within a predetermined time, the vehicle control portion may execute the traveling control, and when the first preceding vehicle is decelerating so that the first preceding vehicle stops within a predetermined time, the vehicle control portion may execute the stop control.

With the above-described configuration, the inter-vehicle distance control apparatus can be applied to a system that executes an inter-vehicle distance control in an entire vehicle speed range (i.e., a full speed range ACC system).

A second aspect of the invention relates to an inter-vehicle distance control method. The inter-vehicle distance control method includes obtaining object detection information from a detection portion that detects a first preceding vehicle ahead of a vehicle, and an object ahead of the first preceding vehicle; calculating a first possible target stop position taking into account the first preceding vehicle, and calculating a second possible target stop position taking into account the object ahead of the first preceding vehicle, based on the object detection information; and setting a target stop position for the vehicle to one of the first possible target stop position and the second possible target stop position, which is closer to the vehicle than the other of the first possible target stop position and the second possible target stop position is.

In the above-described aspect, when the object is a second preceding vehicle ahead of the first preceding vehicle, and the second preceding vehicle is stopped, the second possible target stop position may be calculated based on a position at which the second preceding vehicle is stopped.

In the above-described aspect, when the first preceding vehicle is decelerating, the first possible target stop position may be calculated based on a position at which the first preceding vehicle is estimated to stop.

The inter-vehicle distance control method according to the above-described aspect may further include executing a traveling control that makes the vehicle follow the first preceding vehicle in a manner such that a distance between the vehicle and the first preceding vehicle is equal to a target inter-vehicle distance corresponding to a current speed of the vehicle, when the first preceding vehicle is not decelerating, and executing a stop control that stops the vehicle at the set target stop position, when the first preceding vehicle is decelerating.

BRIEF DESCRIPTION OF THE DRAWINGS

The features, advantages, and technical and industrial significance of this invention will be described in the following detailed description of example embodiments of the invention with reference to the accompanying drawings, in which like numeral denote like elements, and wherein.

DETAILED DESCRIPTION OF EMBODIMENTS

Figure 1:
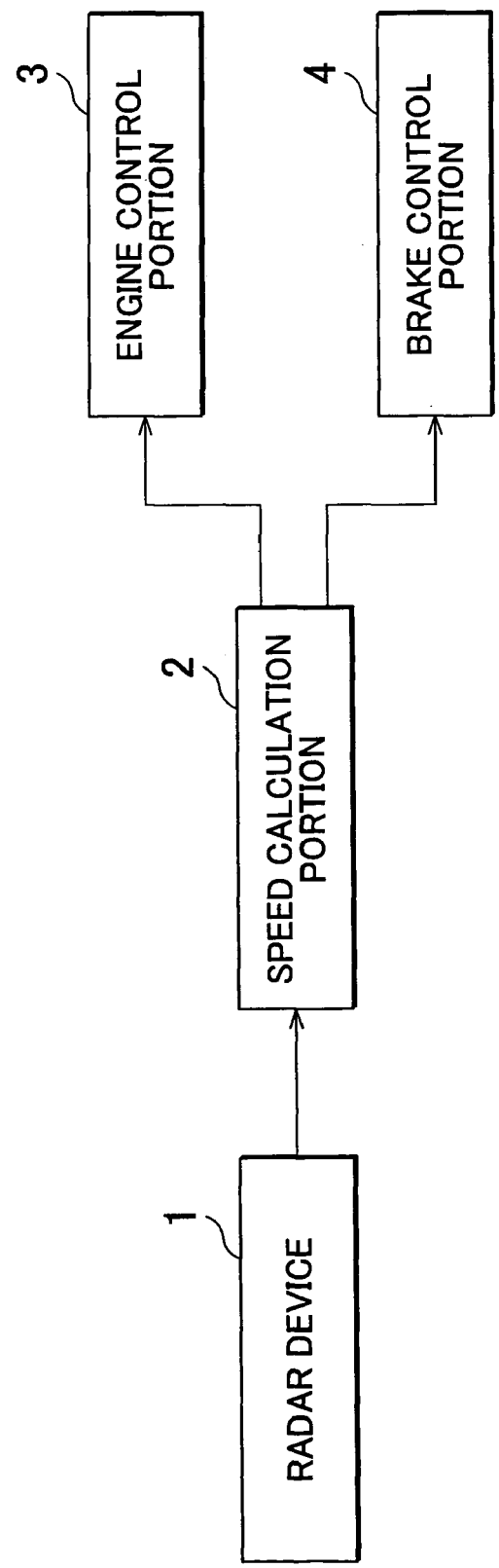
FIG. 1 is a block diagram showing an example of the configuration of functions of a vehicle control system that includes an inter-vehicle distance control apparatus according to an embodiment of the invention.

Hereinafter, an inter-vehicle distance control apparatus according to an embodiment of the invention will be described with reference to FIG. 1. In the embodiment, a vehicle control system that includes the inter-vehicle distance control apparatus is provided in a vehicle. For example, the vehicle control system controls drive power and braking power of the host vehicle, according to the position of the host vehicle relative to a vehicle ahead of the host vehicle (hereinafter, the vehicle ahead of the host vehicle will be referred to as "first preceding vehicle"), and a vehicle ahead of the first preceding vehicle (hereinafter, the vehicle ahead of the first preceding vehicle will be referred to as "second preceding vehicle"), and the speed of the host vehicle relative to the first and second preceding vehicles. For example, the vehicle control system is a so-called Adaptive Cruise Control (ACC) system. The vehicle control system maintains the distance between the host vehicle and the first preceding vehicle, or the speed of the host vehicle, by automatically controlling the drive power and the braking power of the host vehicle. Typically, the vehicle control system may be a full speed range ACC system. When there is the first preceding vehicle, the full speed range ACC system controls the host vehicle so that the host vehicle follows the first preceding vehicle while the distance between the host vehicle and the first preceding vehicle is maintained at a preset inter-vehicle distance that is set in advance for each vehicle speed in an entire vehicle speed range. When there is no first preceding vehicle, the full speed range ACC system controls the host vehicle so that the host vehicle constantly travels at a preset vehicle speed. Thus, the full speed range ACC system seamlessly controls the host vehicle in the entire vehicle speed range from a low speed range to a high speed range. FIG. 1 is a block diagram showing an example of the configuration of functions of the vehicle control system that includes the inter-vehicle distance control apparatus.

In FIG. 1, the vehicle control system includes a radar device 1, a speed calculation portion 2, an engine control portion 3, and a brake control portion 4. The speed calculation portion 2 may be regarded as an example of the inter-vehicle distance control apparatus according to the invention.

For example, the radar device 1 includes a millimeter-wave radar that emits an electromagnetic wave with a millimeter wavelength forward from the host vehicle, and receives a reflected wave from an object ahead of the host vehicle, thereby detecting the position of the object. The radar device 1 measures, for example, the position(s) of the other vehicle(s) (for example, the first preceding vehicle and the second preceding vehicle) or an obstacle ahead of the host vehicle, and the speed(s) of the other vehicle(s) ahead of the host vehicle relative to the host vehicle, based on the reflected wave received by the radar device 1. Then, the radar device 1 outputs object detection information that shows the result of the measurement, to the speed calculation portion 2.

The engine control portion 3 is a control device that controls an engine that provides the drive power of the vehicle. For example, the engine control portion 3 includes an engine Electrical Control Unit (ECU). The engine control portion 3 controls the opening amount of a throttle valve for the engine, according to an accelerator operation performed by a driver and the state of the engine. Also, when the engine control portion 3 receives an engine control signal from the speed calculation portion 2, the engine control portion 3 controls the opening amount of the throttle valve so that the speed of the host vehicle becomes equal to a target speed indicated by the engine control signal (i.e., the drive power of the host vehicle becomes equal to target drive power).

The brake control portion 2 is a control device that controls a brake that provides the braking power of the vehicle. For example, the brake control portion 2 includes a brake ECU. The brake control portion 4 controls the operation of a brake actuator according to, for example, a brake operation performed by the driver, thereby adjusting a brake hydraulic pressure of a wheel cylinder. Also, when the brake control portion 4 receives a brake control signal from the speed calculation portion 2, the brake control portion 4 controls a brake actuator so that the speed of the host vehicle becomes equal to the target speed indicated by the brake control signal (i.e., the braking power of the host vehicle becomes equal to target braking power).

The speed calculation portion 2 is a control device that controls the entire vehicle control system. For example, the speed calculation portion 2 includes a speed calculation ECU. More specifically, the speed calculation portion 2 includes a Central Processing Unit (CPU) and a storage device such as a Random Access Memory (RAM). When the driver performs an operation for activating the vehicle control system, the speed calculation portion 2 activates the vehicle control system. When the driver performs an operation for stopping the vehicle control system, the speed calculation portion 2 stops the vehicle control system. Also, when the vehicle control system is in operation, the speed calculation portion 2 calculates the target speed at which the vehicle should travel, based on the object detection information regarding the object(s) ahead of the vehicle, which is obtained from the radar device 1. Then, the speed calculation portion 2 outputs the engine control signal corresponding to the target speed and the brake control signal corresponding to the target speed, to the engine control portion 3 and the brake control portion 4, respectively. When the target speed calculated by the speed calculation portion 2 is higher than the current speed of the host vehicle, an acceleration control is executed to increase the speed of the host vehicle to a speed higher than the current speed. When the target speed calculated by the speed calculation portion 2 is lower than the current speed of the host vehicle, a deceleration control is executed to decrease the speed of the host vehicle to a speed lower than the current speed.

Figure 2:
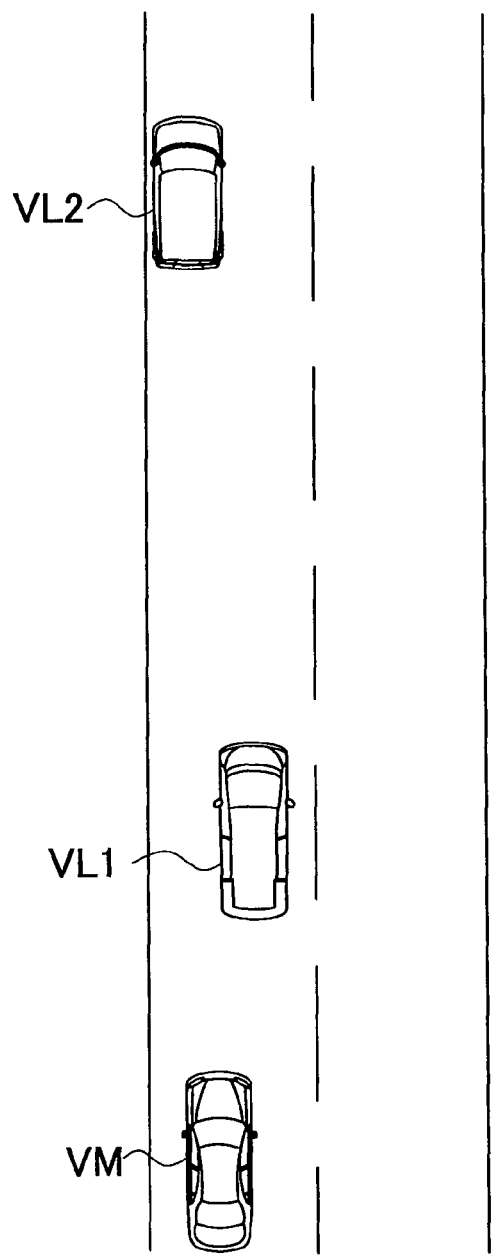
FIG. 2 is an explanatory diagram showing an example where there are a first preceding vehicle and a second preceding vehicle ahead of a host vehicle.

FIG. 2 shows an example where there are a first preceding vehicle VL1 and a second preceding vehicle VL2 ahead of a host vehicle VM provided with the vehicle control system. Both of the first preceding vehicle VL1 and the second preceding vehicle VL2 are positioned in the same lane as the lane in which the host vehicle VM travels, and positioned ahead of the host vehicle VM. The first preceding vehicle VL1 is closer to the host vehicle than the second preceding vehicle VL2 is. In this situation, the speed calculation portion 2 controls the speed of the host vehicle VM according to the position and the speed of each of the first preceding vehicle VL1 and the second preceding vehicle VL2.

Figure 3:
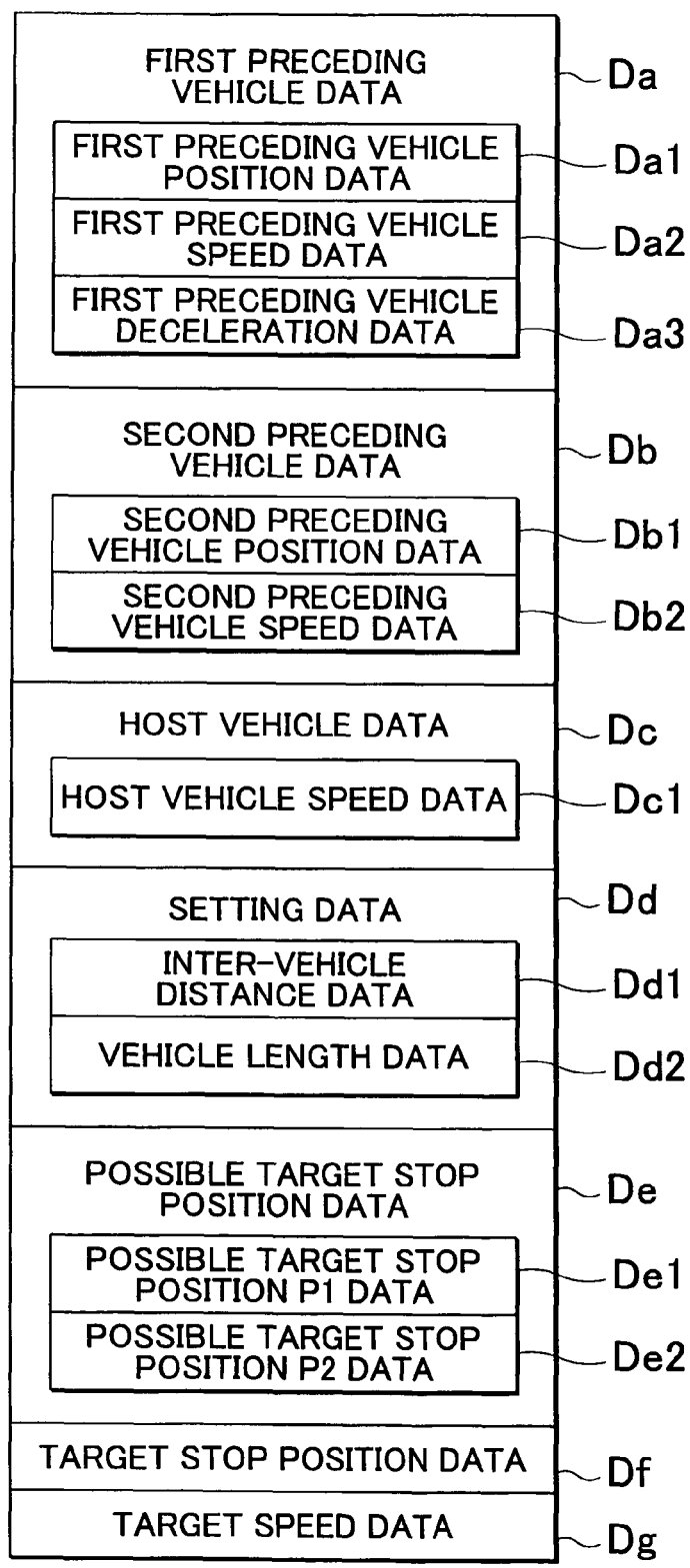
FIG. 3 is a diagram showing examples of main data stored in a memory of a speed calculation portion in FIG. 1.
Figure 4:
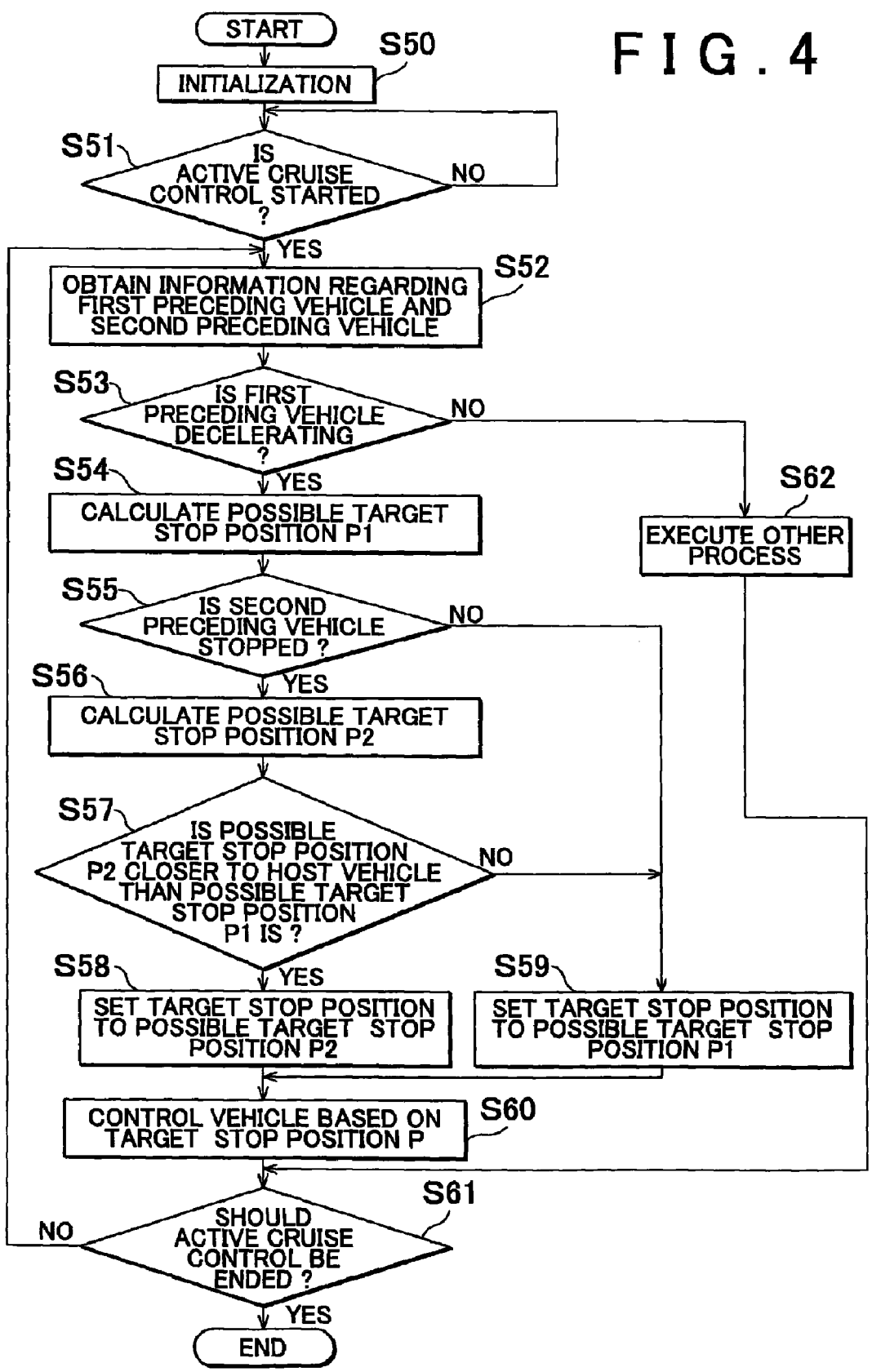
FIG. 4 is a flowchart showing an example of a routine executed by the speed calculation portion in FIG. 1.
Figure 5:
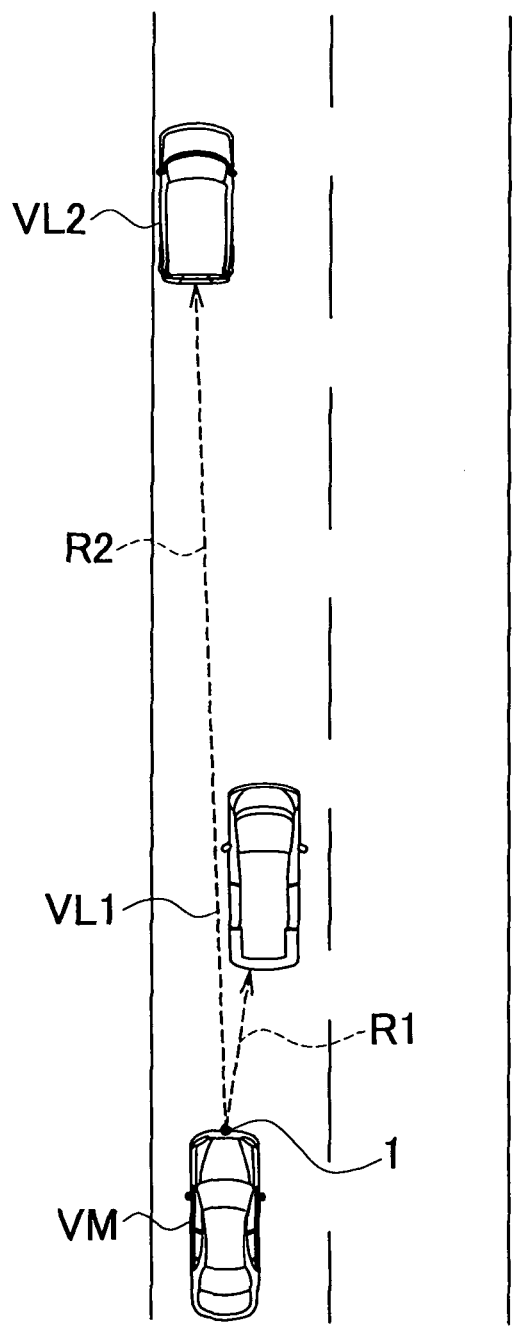
FIG. 5 is a diagram showing an example where a radar device in FIG. 1 detects the first preceding vehicle and the second preceding vehicle.
Figure 6:
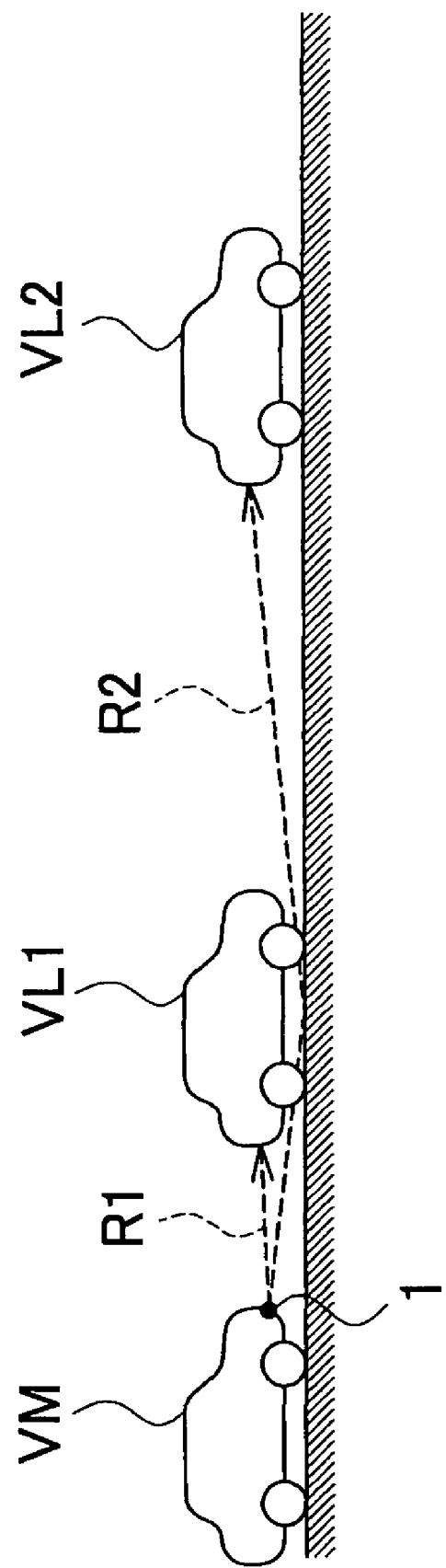
FIG. 6 is a diagram showing another example where the radar device in FIG. 1 detects the first preceding vehicle and the second preceding vehicle.
Figure 7:
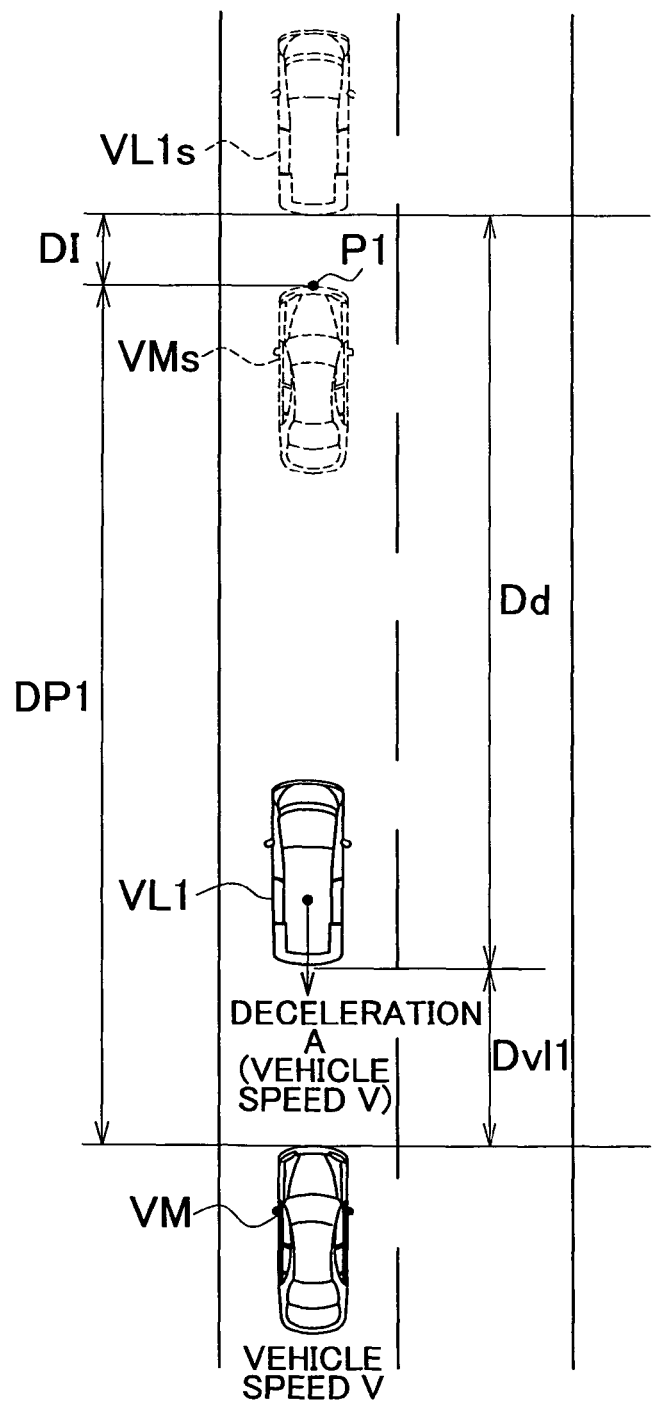
FIG. 7 is a diagram illustrating an example where a possible target stop position is calculated according to the embodiment of the invention.
Figure 8:
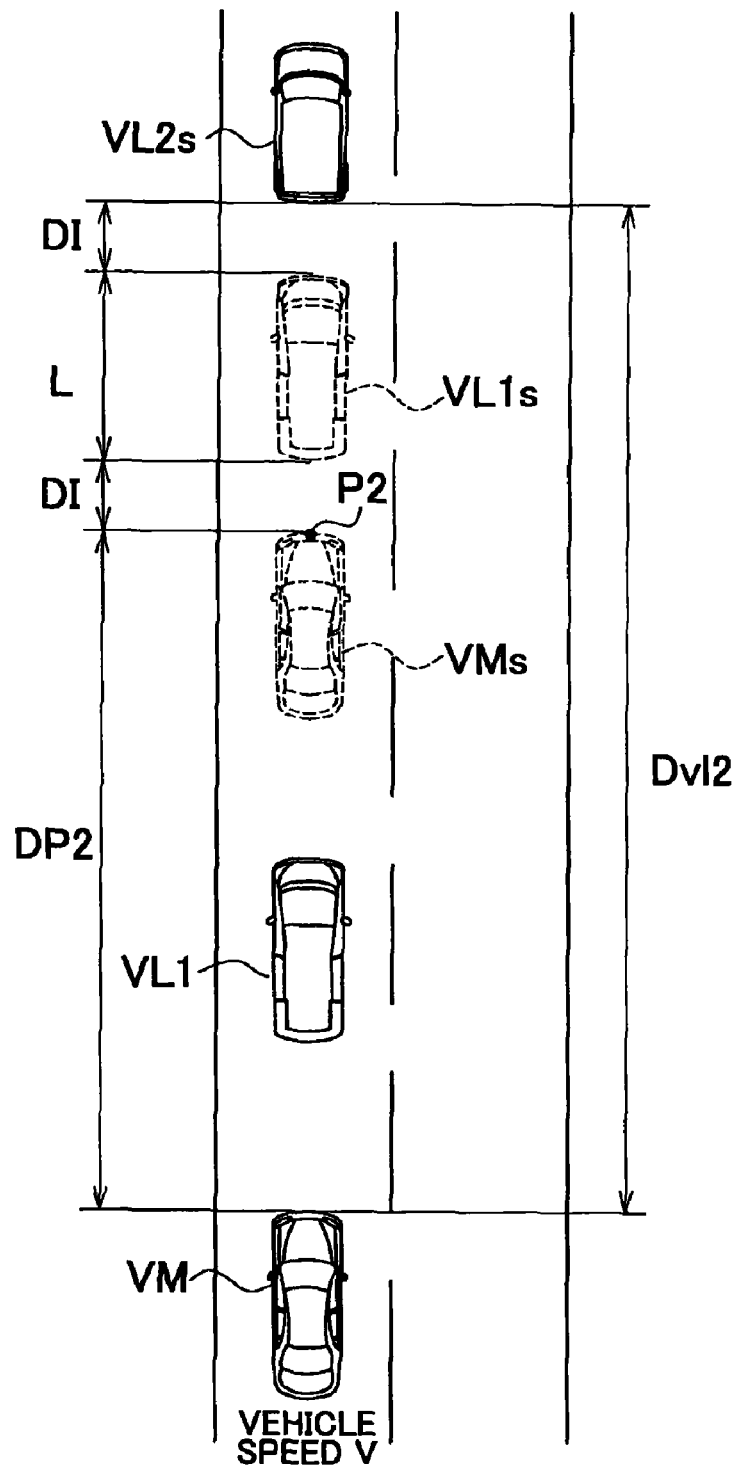
FIG. 8 is a diagram illustrating an example where another possible target stop position is calculated according to the embodiment of the invention.

Next, examples of main data used in an inter-vehicle distance control routine and an example of the operation of the speed calculation portion 2 will be described with reference to FIG. 3 to FIG. 8. FIG. 3 shows examples of the main data stored in the memory of the speed calculation portion 2. FIG. 4 is a flowchart showing an example of the routine executed by the speed calculation portion 2. FIG. 5 shows an example where the radar device 1 detects the first preceding vehicle VL1 and the second preceding vehicle VL2. FIG. 6 shows another example where the radar device 1 detects the first preceding vehicle VL1 and the second preceding vehicle VL2. FIG. 7 illustrates an example where a possible target stop position P1 is calculated. FIG. 8 illustrates an example where a possible target stop position P2 is calculated.

The flowchart in FIG. 4 shows an example of the operation performed until the host vehicle VM, which has followed the first preceding vehicle VL1, stops at a target stop position P. It is assumed that when the routine based on the flowchart is started, a vehicle-following control for following the first preceding vehicle VL1 is being executed. The speed calculation portion 2 executes each step in the flowchart in FIG. 4 by executing a predetermined program. The program used to execute the routine is stored in advance in, for example, the storage area provided in the speed calculation portion 2 (for example, the memory, a hard disc, and an optical disc). When a power supply for the speed calculation portion 2 is turned on, the speed calculation portion 2 executes the predetermined program.

In FIG. 3, for example, first preceding vehicle data Da, second preceding vehicle data Db, host vehicle data Dc, setting data Dd, possible target stop position data De, target stop position data Df, and target speed data Dg are stored in the memory of the speed calculation portion 2.

The first preceding vehicle data Da includes, for example, first preceding vehicle position data Da1, first preceding vehicle speed data Da2, and first preceding vehicle deceleration data Da3. The first preceding vehicle position data Da1 shows information on the position of the first preceding vehicle VL1 obtained based on the object detection information regarding the object(s) ahead of the host vehicle VM, which is obtained from the radar device 1. That is, the first preceding vehicle position data Da1 shows a relative distance Dvl1 between the host vehicle VM and the first preceding vehicle VL1. The first preceding vehicle speed data Da2 shows information on the speed of the first preceding vehicle VL1, which is obtained based on the information obtained from the radar device 1. That is, the first preceding vehicle speed data Da2 shows a relative speed Vvl1 that is the speed of the first preceding vehicle VL1 relative to the host vehicle VM. The first preceding vehicle deceleration data Da3 shows information on the deceleration of the first preceding vehicle VL1 obtained based on the information obtained from the radar device 1. That is, the first preceding vehicle deceleration data Db3 shows relative deceleration Avl1 that is the deceleration of the first preceding vehicle VL1 relative to the host vehicle VM.

The second preceding vehicle data Db includes, for example, second preceding vehicle position data Db1 and second preceding vehicle speed data Db2. The second preceding vehicle position data Db1 shows information on the position of the second preceding vehicle VL2 obtained based on the object detection information regarding the object(s) ahead of the host vehicle VM, which is obtained from the radar device 1. That is, the second preceding vehicle position data Db1 shows a relative distance Dvl2 between the host vehicle VM and the second preceding vehicle VL2. The second preceding vehicle speed data Db2 shows information on the speed of the second preceding vehicle VL2, which is obtained based on the information obtained from the radar device 1. That is, the second preceding vehicle speed data Db2 shows a relative speed Vvl2 that is the speed of the second preceding vehicle VL2 relative to the host vehicle VM.

The host vehicle data Dc includes, for example, host vehicle speed data Dc1. The host vehicle speed data Dc1 shows the speed of the host vehicle VM calculated based on the information obtained from, for example, a vehicle speed sensor provided in the host vehicle.

The setting data Dd includes, for example, inter-vehicle distance data Dd1 and vehicle length data Dd2. The inter-vehicle distance data Dd1 shows an inter-vehicle distance set according to the vehicle speed. For example, the inter-vehicle distance data Dd1 shows an inter-vehicle distance DI used when the host vehicle stops. The inter-vehicle distance DI is changeable according to the intention of the driver. For example, the inter-vehicle distance DI is set to one of three levels, that is, a long distance, a middle distance, and a short distance (for example, 5 m, 4 m, and 3 m), according to the operation of an inter-vehicle distance selection switch. The vehicle length data Dd2 shows a vehicle length L that is set in advance. For example, the vehicle length L is set to 5 m that is the length of an ordinary vehicle.

The possible target stop position data De includes, for example, possible target stop position P1 data De1 and possible target stop position P2 data De2. The possible target stop position P1 data De1 shows the first possible target stop position for the host vehicle. That is, the possible target stop position P1 data De1 shows the possible target stop position P1 calculated taking into account the first preceding vehicle VL1. The possible target stop position P2 data De2 shows the second possible target stop position for the host vehicle. That is, the possible target stop position P2 data De2 shows the possible target stop position P2 calculated taking into account the second preceding vehicle VL2. For example, the possible target stop position P1 and the possible target stop position P2 are indicated by respective distances from the current position of the host vehicle VM to the possible target stop positions P1 and P2 (that is, a distance DP1 and a distance DP2 described later).

The target stop position data Df shows the target stop position P for the host vehicle determined based on the possible target stop positions. For example, the target stop position P is indicated by a distance from the current position of the host vehicle to the target stop position P (that is, a distance DP described later). The target speed data Dg shows a target speed Vt of the host vehicle calculated based on the determined target stop position P.

In FIG. 4, the speed calculation portion 2 executes an initialization process (step S50), and then, proceeds to the next step. For example, in the initialization process, the speed calculation portion 2 initializes each parameter stored in, for example, the memory of the speed calculation portion 2, to a prescribed value. Also, the speed calculation portion 2 sets the inter-vehicle distance DI stored in the inter-vehicle distance data Dd1 according to the operation performed by the driver, and thus, updates the data that shows the inter-vehicle distance DI.

Next, the speed calculation portion 2 waits for the start of an active cruise control for the host vehicle VM (step S51). For example, the speed calculation portion 2 starts the active cruise control when the driver performs the operation for activating the vehicle control system. When the speed calculation portion 2 starts the active cruise control, the speed calculation portion 2 proceeds to the next step S52.

In step S52, the speed calculation portion 2 obtains information regarding the first preceding vehicle VL1 and the second preceding vehicle VL2, using the object detection information regarding the object(s) ahead of the host vehicle VM, which is obtained from the radar device 1. Then, the speed calculation portion 2 proceeds to the next step. More specifically, the speed calculation portion 2 calculates the relative distance Dvl1 between the host vehicle VM and the first preceding vehicle VL1, the relative speed Vvl1 that is the speed of the first preceding vehicle VL1 relative to the host vehicle VM, and the relative deceleration Avl1 that is the deceleration of the first preceding vehicle VL1 relative to the host vehicle VM. Thus, the speed calculation portion 2 updates the first preceding vehicle position data Da1, the first preceding vehicle speed data Da2, and the first preceding vehicle deceleration data Da3. Also, the speed calculation portion 2 calculates the relative distance Dvl2 between the host vehicle VM and the second preceding vehicle VL2, and the relative speed Vvl2 that is the speed of the second preceding vehicle VL2 relative to the host vehicle VM, using the object detection information obtained from the radar device 1. Thus, the speed calculation portion 2 updates the second preceding vehicle position data Db1 and the second preceding vehicle speed data Db2.

For example, the radar device 1 includes a millimeter-wave radar. The radar device 1 detects the position of the second preceding vehicle VL2 positioned ahead of the first preceding vehicle VL1, for example, using the deviation of the position of the second preceding vehicle VL2 from the position of the first preceding vehicle VL1 in a lateral direction, or reflection from a road surface.

For example, as shown in FIG. 5, the radar device 1 detects the first preceding vehicle VL1 by receiving a reflected wave that is an electromagnetic wave R1 reflected from the first preceding vehicle VL1. Also, as shown in FIG. 5, if the position of the second preceding vehicle VL2 deviates from the position of the first preceding vehicle VL1 in the lateral direction, a portion of the second preceding vehicle VL2 does not overlap the first preceding vehicle VL1 due to the deviation in the lateral direction, when seen from the position of the radar device 1. In this case, the radar device 1 detects the second preceding vehicle VL2 by receiving the reflected wave that is an electromagnetic wave R2 reflected from the portion of the second preceding vehicle VL2, which does not overlap the first preceding vehicle VL1.

In another example, as shown in FIG. 6, the radar device 1 detects the first preceding vehicle VL1 by receiving the reflected wave that is the electromagnetic wave R1 reflected from the first preceding vehicle VL1. Also, as shown in FIG. 6, the electromagnetic wave R2, which is emitted by the radar device 1, is reflected from the road surface, and thus, passes through a space under the floor surface of the first preceding vehicle VL1 and reaches the second preceding vehicle VL2. Then, the electromagnetic wave R2 is reflected from the second preceding vehicle VL2, and thus, passes through the space under the floor surface of the first preceding vehicle VL1 and reaches the radar device 1 through a route opposite to the route through which the electromagnetic wave R2 proceeds from the radar device 1 to the second preceding vehicle VL2. Thus, the radar device 1 receives the reflected electromagnetic wave R2, thereby detecting the second preceding vehicle VL2.

The radar device 1 may derive at least one of the relative distance Dvl1, the relative speed Vvl1, the relative deceleration Avl1, the relative distance Dvl2, and the relative speed Vvl2. In this case, the object detection information output from the radar device 1 to the speed calculation portion 2 includes information that shows the derived parameter(s). Thus, the speed calculation, portion 2 updates the data using the derived parameter(s). Also, the radar device 1 may output only the information on the positions of the first preceding vehicle VL1 and the second preceding vehicle VL2 relative to the host vehicle VM, to the speed calculation portion 2, and then, the speed calculation portion 2 may perform a calculation process thereafter. Further, the radar device 1 may output, to the speed calculation portion 2, the information at any stage in the procedure for determining each of the relative distance Dvl1, the relative speed Vvl1, the relative deceleration Avl1, the relative distance Dvl2, and the relative speed Vvl2.

Referring to FIG. 4 again, after the process in step S52 is executed, the speed calculation portion 2 determines whether the first preceding vehicle VL1 followed by the host vehicle VM is decelerating (step S53). For example, the speed calculation portion 2 determines the relative speed Vvl1 and/or the relative deceleration Avl1 of the first preceding vehicle VL1, referring to the first preceding vehicle speed data Da2 and/or the first preceding vehicle deceleration data Da3. Then, the speed calculation portion 2 determines whether the first preceding vehicle VL1 is decelerating, using the relative speed Vvl1 and/or the relative deceleration Avl1. Next, when the first preceding vehicle VL1 is decelerating, the speed calculation portion 2 changes the control mode of the vehicle control system from the vehicle-following control to a stop control. Then, the speed calculation portion 2 proceeds to the next step S54. When the first preceding vehicle VL1 is not decelerating, the speed calculation portion 2 proceeds to the step S62.

In step S54, the speed calculation portion 2 calculates the possible target stop position P1, and thus, updates the possible target stop position P1 data De1. Then, the speed calculation portion 2 proceeds to the next step. Hereinafter, an example of a method of calculating the possible target stop position P1 will be described with reference to FIG. 7.

In FIG. 7, the speed of the first preceding vehicle VL1 is V (m/s), the deceleration of the first preceding vehicle VL1 is A (m/s$^2$), and the relative distance between the host vehicle VM and the first preceding vehicle VL1 is Dvl1 (m). On the assumption that the first preceding vehicle VL1 continues to decelerate at the constant deceleration A until the first preceding vehicle VL1 stops, a distance Dd that the first preceding vehicle VL1 travels until the first preceding vehicle VL1 stops is determined using the following equation.

$$Dd = \int_0^t (V - At)\,dt = Vt - \frac{1}{2} A * t^2$$

In this equation, "t" represents a time (s) required to stop the first preceding vehicle VL1 from the current time point. The time "t" is calculated according to the equation, t=V/A. The position of a first preceding vehicle VL1s shown by the dashed line in FIG. 7 indicates the position at which the first preceding vehicle VL1 stops after the first preceding vehicle VL1 is decelerating at the constant deceleration A.

On the assumption that the host vehicle VM stops while the distance between the host vehicle VM and the first preceding vehicle VL1 is maintained at the inter-vehicle distance DI, the distance DP1 from the current position of the host vehicle VM to the possible target stop position P1 is calculated using the equation, DP1=Dd+Dvl1−DI. The position of a host vehicle VMs shown by the dashed line in FIG. 7 indicates the position of the host vehicle VM when the host vehicle VM stops at the possible target stop position P1 determined based on the position of the stopped first preceding vehicle VL1s. For example, when the speed V of the first preceding vehicle VL1 is 10 m/s (36 km/h), the deceleration A of the first preceding vehicle VL1 is 1 m/s² (0.1 G), the relative distance Dvl1 between the host vehicle VM and the first preceding vehicle VL1 is 30 m, and the inter-vehicle distance DI is 5 m, the distance DP1 is calculated as follows. DP1=50+30−5=75 m.

Referring to FIG. 4 again, after the speed calculation portion 2 executes the process in step S54, the speed calculation portion 2 determines whether the second preceding vehicle VL2 is stopped (step S55). For example, the speed calculation portion 2 determines the relative speed Vvl2 that is the speed of the second preceding vehicle VL2 relative to the host vehicle VL, referring to the second preceding vehicle speed data Db2. Then, the speed calculation portion 2 determines whether the second preceding vehicle VL2 is stopped, using the relative speed Vvl2. Next, when the second preceding vehicle VL2 is stopped, the speed calculation portion 2 proceeds to the next step S56. When the second preceding vehicle VL2 is not stopped, or when there is no second preceding vehicle VL2, the speed calculation portion 2 proceeds to the next step S59.

In step S56, the speed calculation portion 2 calculates the possible target stop position P2, and thus, updates the possible target stop position P2 data De2. Then, the speed calculation portion 2 proceeds to the next step. Hereinafter, an example of a method of calculating the possible target stop position P2 will be described with reference to FIG. 8.

In FIG. 8, it is assumed that the first preceding vehicle VL1 (the first preceding vehicle VL1s shown by the dashed line in FIG. 8) stops while the distance between the first preceding vehicle VL1 and the stopped second preceding vehicle VL2 (a second preceding vehicle VL2s in FIG. 8) is maintained at the inter-vehicle distance DI, and the host vehicle VM (the host vehicle VMs shown by the dashed line in FIG. 8) stops while the distance between the host vehicle VM and the first preceding vehicle VL1 (the first preceding vehicle VL1s shown by the dashed line in FIG. 8) is maintained at the inter-vehicle distance DI. On this assumption, the distance DP2 from the current position of the host vehicle VM to the possible target stop position P2 is calculated using the following equation. DP2=Dvl2−DI*2−L. In this equation, L (m) is assumed to be the length of the first preceding vehicle VL1. The length L of an ordinary vehicle (for example, 5 m) stored in the vehicle length data Dd2 is employed as the value of L in this equation. For example, if the relative distance Dvl2 between the host vehicle VM and the second preceding vehicle VL2 is 80 m, and the inter-vehicle distance DI is 5 m, the distance DP2 is calculated as follows. DP2=80−5*2−5=65 m.

Referring to FIG. 4 again, after the speed calculation portion 2 executes the process in step S56, the speed calculation portion 2 determines whether the possible target stop position P2 is closer to the host vehicle VM than the possible target stop position P1 is (step S57). When the possible target stop position P2 is closer to the host vehicle VM than the possible target stop position P1 is, the speed calculation portion 2 proceeds to the next step S58. When the possible target stop position P2 is not closer to the host vehicle VM than the possible target stop position P1 is, the speed calculation portion 2 proceeds to the next step S59. For example, the speed calculation portion 2 determines the distance DP1 and the distance DP2, by referring to the possible target stop position P1 data De1 and the possible target stop position P2 data De2. Then, when the distance DP1 is longer than the distance DP2, the speed calculation portion 2 determines that the possible target stop position P2 is closer to the host vehicle VM than the possible target stop position P1 is. For example, in the above-described calculation example, the distance DP1 is 75 m, and the distance DP2 is 65 m. Therefore, the possible target stop position P2 is closer to the host vehicle VM than the possible target stop position P1 is.

In step S58, the speed calculation portion 2 sets the target stop position P to the possible target stop position P2, ands updates the distance DP stored in the target stop position data Df using the distance DP2. Then, the speed calculation portion 2 proceeds to the next stop S60.

In contrast, in step S59, the speed calculation portion 2 sets the target stop position P to the possible target stop position P1, and updates the distance DP stored in the target stop position data Df using the distance DP1. Then, the speed calculation portion 2 proceeds to the next stop S60.

In step S60, the speed calculation portion 2 controls the host vehicle VM based on the target stop position P, and then, proceeds to step S61. For example, the speed calculation portion 2 calculates the target speed Vt at which the host vehicle VM should travel, based on the distance DP stored in the target stop position data Df, and thus, updates the target speed data Dg. Then, the speed calculation portion 2 outputs the engine control signal corresponding to the target speed Vt and the brake control signal corresponding to the target speed Vt, to the engine control portion 3 and the brake control portion 4, respectively. Thus, the speed calculation portion 2 controls the engine control portion 3 and the brake control portion 4 so that the host vehicle VM stops at the target stop position P.

When it is determined that the first preceding vehicle VL1 is not decelerating in step S53, the speed calculation portion 2 executes the other process (step S62), and then, proceeds to the next step S61. For example, the speed calculation portion 2 calculates the target speed Vt so that the host vehicle VM follows the first preceding vehicle VL1 while the distance between the host vehicle VM and the first preceding vehicle VL1 is maintained at a target inter-vehicle distance set according the current vehicle speed, based on the object detection information regarding the first preceding vehicle VL1 obtained from the radar device 1. Then, the speed calculation portion 2 executes the control so that the host vehicle VM follows the first preceding vehicle VL1, by outputting the engine control signal corresponding to the target speed Vt and the brake control signal corresponding to the target speed Vt, to the engine control portion 3 and the brake control portion 4, respectively. When the target speed Vt calculated by the speed calculation portion 2 is higher than the current speed of the host vehicle VM, the acceleration control is executed to increase the speed of the host vehicle VM to a speed higher than the current speed. When the target speed Vt calculated by the speed calculation portion 2 is lower than the current speed of the host vehicle VM, the deceleration control is executed to decrease the speed of the host vehicle VM to a speed lower than the current speed.

In step S61, the speed calculation portion 2 determines whether to end the active cruise control for the host vehicle VM. For example, when the driver performs the operation for stopping the vehicle control system, the speed calculation portion 2 ends the active cruise control. When the active cruise control should be continued, the speed calculation portion 2 returns to step S52, and repeatedly executes the routine. When the active cruise control should be ended, the speed calculation portion 2 ends the routine shown by the flowchart.

As described above, when the second preceding vehicle VL2 is stopped ahead of the first preceding vehicle VL1, the inter-vehicle distance control apparatus according to the embodiment executes the control that stops the host vehicle VM taking into account the position of the second preceding vehicle VL2. Therefore, it is possible to reduce the possibility that the host vehicle VM is suddenly braked. For example, in the case where the control that stops the host vehicle VM is executed using only the position and the speed of the first preceding vehicle VL1, when the first preceding vehicle VL1 is suddenly braked according to the position at which the second preceding vehicle VL2 is stopped, the host vehicle VM needs to be suddenly braked as well as the first preceding vehicle VL1. However, with the inter-vehicle distance control apparatus according to the embodiment, when the possible target stop position P2 is close to the current position of the host vehicle VM, it is predicted that the first preceding vehicle VL1 will be suddenly braked according to the position at which the second preceding vehicle VL2 is stopped. Thus, the host vehicle VM is controlled by setting the target stop position P to the possible target stop position P2 in advance. That is, the inter-vehicle distance control apparatus predicts in advance that the first preceding vehicle VL1 will stop according to the position at which the second preceding vehicle VL2 is stopped, and controls the host vehicle VM based on the prediction. Therefore, it is possible to reduce the possibility that the host vehicle VM is suddenly braked.

In the above description, the inter-vehicle distance control apparatus according to the invention is applied to the full speed range ACC system. However, the inter-vehicle distance control apparatus may be applied to the ACC system for a high speed range (high speed range ACC system), or the ACC system for a low speed range (low speed range ACC system).

Also, in the above description, when the second preceding vehicle VL2 is stopped, the possible target stop position P2 is calculated (refer to step S55 and step S56 in FIG. 4). However, the possible target stop position P2 may be calculated also when the second preceding vehicle VL2 is in the other traveling state. For example, the possible target stop position P2 may be calculated also when the second preceding vehicle VL2 is decelerating so that the preceding vehicle VL2 stops within a predetermined time. In this case, it is possible to execute the inter-vehicle distance control in the same manner, by calculating an estimated stop position at which the second preceding vehicle VL2 is estimated to stop based on the deceleration of the second preceding vehicle VL2, and calculating the possible target stop position P2 based on the estimated stop position.

Also, in step S55, an obstacle (for example, a parked vehicle or a building) ahead of the first preceding vehicle VL1 may be regarded as the stopped second preceding vehicle VL2, and the processes in the subsequent steps may be executed. That is, in the case where there is an obstacle ahead of the first preceding vehicle VL1, an affirmative determination may be made in step S55, and the processes in the subsequent steps may be executed, as well as the case where the second preceding vehicle VL2 is stopped. In this case as well, because it is predicted that the first preceding vehicle VL1 will stop behind the detected obstacle, it is possible to execute the inter-vehicle distance control in the same manner by calculating the possible target stop position P2 based on a position at which the obstacle ahead of the first preceding vehicle VL1 is located.

Also, in the above description, the speed calculation portion 2 executes the initialization process in the inter-vehicle distance control routine, before the active cruise control is started (refer to step S50 in FIG. 4). However, the values of the parameters set in the initialization process may be changed at the other timing. For example, even when the vehicle control system is in operation, the data (more specifically, the inter-vehicle distance DI and the vehicle length L) stored in the setting data Dd may be changed according to the operation performed by the driver.

Also, in the above-described example, the inter-vehicle distance DI stored in the inter-vehicle distance data Dd1 is set according to the operation performed by the driver. However, the data that shows the inter-vehicle distance DI may be set in the other manners. For example, the speed calculation portion 2 may automatically set the inter-vehicle distance DI, and thus, update the inter-vehicle distance data Dd1 according to, for example, the situation where the host vehicle VM travels, the environment around the host vehicle VM, and a learning history regarding the travel of the host vehicle VM.

Also, in the above-described example, the inter-vehicle distance DI used when the possible target stop position P1 is calculated and the inter-vehicle distance DI used when the possible target stop position P2 is calculated are set to the same value. However, the inter-vehicle distance DI may be set to different values according to the vehicles between which the inter-vehicle distance DI is set. For example, the inter-vehicle distance DI between the second preceding vehicle VL2 and the first preceding vehicle VL1, and the inter-vehicle distance DI between the first preceding vehicle VL1 and the host vehicle VM may be set to different values. More specifically, it is difficult to determine how long the distance between the second preceding vehicle VL2 and the first preceding vehicle VL1 will be when the first preceding vehicle VL1 stops. Accordingly, the inter-vehicle distance between the second preceding vehicle VL2 and the first preceding vehicle VL1 may be set taking into account a safety factor. That is, the inter-vehicle distance between the second preceding vehicle VL2 and the first preceding vehicle VL1 may be set to be longer than the inter-vehicle distance DI between the first preceding vehicle VL1 and the host vehicle VM. For example, the inter-vehicle distance between the second preceding vehicle VL2 and the first preceding vehicle VL1 may be set to a value obtained by adding a given distance to the inter-vehicle distance DI, or by multiplying the inter-vehicle distance DI by a given rate.

In the above-described example, when the first preceding vehicle VL1 is decelerating, the control mode of the vehicle control system is changed from the vehicle-following control to the stop control (refer to step S53 in FIG. 4). However, the control mode may be changed from the vehicle-following control to the stop control when the first preceding vehicle VL1 is in the other traveling state. For example, when the first preceding vehicle VL1 is decelerating so that the first preceding vehicle VL1 stops within a predetermined time, the control mode of the vehicle control system may be changed from the vehicle-following control to the stop control, that is, the speed calculation portion 2 may make an affirmative determination in step S53.

Also, in the above-described example of the configuration of the vehicle control system, the engine control portion 3 controls an engine actuator such as a throttle valve, and the brake control portion 4 controls a brake actuator. However, the speed calculation portion 2 may directly control the engine actuator and the brake actuator. Also, the radar device 1 does not necessarily use the millimeter-wave radar. The radar device 1 may measure the position(s) of the other vehicle(s) and/or an obstacle ahead of the host vehicle, and the speed(s) of the other vehicle(s) ahead of the host vehicle relative to the host vehicle, using the other radar sensor, an acoustic wave sensor, a camera, or the like.

The above-described order in which the processes are executed by the speed calculation portion 2, and the above-described methods of calculating the possible target stop position P1 and the possible target stop position P2 are to be considered as merely exemplary. The invention may be realized by executing the processes in the other order, or by calculating the possible target stop position P1 and the possible target stop position P2 using the other calculation method.

The program executed by the speed calculation portion 2 may be supplied to the speed calculation portion 2 through an external storage medium, or supplied to the speed calculation portion 2 through wired or wireless communication line, instead of, or in addition to storing the program in the storage area provided in the speed calculation portion 2.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

When the control that stops the host vehicle is executed, the inter-vehicle distance control apparatus according to the invention reduces the possibility that the host vehicle is suddenly braked. Thus, the inter-vehicle distance control apparatus according to the invention is useful when used in, for example, a system that controls the drive power and the brake power of the host vehicle according to the position of the host vehicle relative to the first preceding vehicle and the like, and the speed of the host vehicle relative to the first preceding vehicle and the like.

The invention claimed is:

1. An inter-vehicle distance control apparatus comprising:
   an information obtaining portion that obtains object detection information from a detection portion that detects a first preceding vehicle ahead of a vehicle, and a second preceding vehicle ahead of the first preceding vehicle;
   a possible-target-stop-position calculation portion that calculates a first possible target stop position taking into account the first preceding vehicle, and calculates a second possible target stop position taking into account the second preceding vehicle, based on the object detection information;
   a speed determination portion that determines whether the first preceding vehicle is decelerating, and that determines whether the second preceding vehicle is stopped; and
   a target-stop-position setting portion that sets a target stop position for the vehicle to one of the first possible target stop position and the second possible target stop position, which is closer to the vehicle than the other of the first possible target stop position and the second possible target stop position is, when the speed determination portion determines the first preceding vehicle is decelerating and the second preceding vehicle is stopped.

2. The inter-vehicle distance control apparatus according to claim 1, wherein:
   when the speed determination portion determines the second preceding vehicle is stopped, the possible-target-stop-position calculation portion calculates the second possible target stop position based on a position at which the second preceding vehicle is stopped.

3. The inter-vehicle distance control apparatus according to claim 2, wherein the possible-target-stop-position calculation portion calculates, as the second possible target stop position, a position at which the vehicle is estimated to stop on an assumption that the first preceding vehicle stops at a target inter-vehicle distance from the position at which the second preceding vehicle is stopped, and the vehicle stops at the target inter-vehicle distance from the first preceding vehicle.

4. The inter-vehicle distance control apparatus according to claim 2, wherein the possible-target-stop-position calculation portion calculates, as the second possible target stop position, a position at which the vehicle is estimated to stop on an assumption that the first preceding vehicle stops at a target inter-vehicle distance from the position at which the second preceding vehicle is stopped, and the vehicle stops at the target inter-vehicle distance from the first preceding vehicle.

5. The inter-vehicle distance control apparatus according to claim 1, wherein when the speed determination portion determines the first preceding vehicle is decelerating, the possible-target-stop-position calculation portion calculates the first possible target stop position based on a position at which the first preceding vehicle is estimated to stop.

6. The inter-vehicle distance control apparatus according to claim 5, wherein the possible-target-stop-position calculation portion determines a position at which the first preceding vehicle is estimated to stop based on the decelerating of the first preceding vehicle, and calculates, as the first possible target stop position, a position at which the vehicle is estimated to stop, based on an assumption that the vehicle stops at a position that is at a target inter-vehicle distance away from the determined position at which the first preceding vehicle is estimated to stop.

7. The inter-vehicle distance control apparatus according to claim 1, further comprising
   a vehicle control portion that selectively executes a traveling control that makes the vehicle follow the first preceding vehicle in a manner such that a distance between the vehicle and the first preceding vehicle is equal to a target inter-vehicle distance corresponding to a current speed of the vehicle, and a stop control that stops the vehicle at the target stop position set by the target-stop-position setting portion, according to a traveling state of the first preceding vehicle.

8. the inter-vehicle distance control apparatus according to claim 7, wherein when the speed determination portion determines the first preceding vehicle is not decelerating, the vehicle control portion executes the traveling control, and when the speed determination portion determines the first preceding vehicle is decelerating, the vehicle control portion executes the stop control.

9. The inter-vehicle distance control apparatus according to claim 7, wherein when the speed determination portion determines the first preceding vehicle is not decelerating, or when the speed determination portion determines the first preceding vehicle is decelerating so that the first preceding vehicle does not stop within a predetermined time, the vehicle control portion executes the traveling control, and when the speed determination portion determines the first preceding vehicle is decelerating so that the first preceding vehicle stops within the predetermined time, the vehicle control portion executes the stop control.

10. An inter-vehicle distance control method comprising:
   obtaining object detection information from a detection portion that detects a first preceding vehicle ahead of a vehicle, and a second preceding vehicle ahead of the first preceding vehicle;
   calculating a first possible target stop position taking into account the first preceding vehicle, and calculating a second possible target stop position taking into account the second preceding vehicle, based on the object detection information;
   determining whether the first preceding vehicle is decelerating, and whether the second preceding vehicle is stopped; and
   setting a target stop position for the vehicle to one of the first possible target stop position and the second possible target stop position, which is closer to the vehicle than the other of the first possible target stop position and the second possible target stop position is, when the first preceding vehicle is determined to be decelerating and the second preceding vehicle is determined to be stopped.

11. The inter-vehicle distance control method according to claim 10, wherein when the second preceding vehicle is determined to be stopped, the second possible target stop position is calculated based on a position at which the second preceding vehicle is stopped.

12. The inter-vehicle distance control method according to claim 10, wherein when the first preceding vehicle is determined to be decelerating, the first possible target stop position is calculated based on a position at which the first preceding vehicle is estimated to stop.

13. The inter-vehicle distance control method according to claim 10, further comprising:
   executing a traveling control that makes the vehicle follow the first preceding vehicle in a manner such that a distance between the vehicle and the first preceding vehicle is equal to a target inter-vehicle distance corresponding to a current speed of the vehicle when the first preceding vehicle is determined to be not decelerating, and executing a stop control that stops the vehicle at the set target stop position when the first preceding vehicle is determined to be decelerating.

* * * * *